United States Patent [19]

Pollack et al.

[11] Patent Number: 4,755,673
[45] Date of Patent: Jul. 5, 1988

[54] SELECTIVE THERMAL RADIATORS

[75] Inventors: Slava A. Pollack, Palos Verdes Estates; David B. Chang, Tustin, both of Calif.

[73] Assignee: Hughes Aircraft Company, Los Angeles, Calif.

[21] Appl. No.: 861,619

[22] Filed: May 6, 1986

Related U.S. Application Data

[63] Continuation of Ser. No. 664,441, Oct. 24, 1984, abandoned.

[51] Int. Cl.$^4$ ............................................... G02F 1/01
[52] U.S. Cl. .................................... 250/330; 350/642; 431/100; 126/901
[58] Field of Search .................... 250/330; 431/100; 126/901, 432, 441, 449; 350/1.6, 1.7, 642

[56] References Cited

U.S. PATENT DOCUMENTS

| | | | |
|---|---|---|---|
| 1,030,787 | 6/1912 | Monosmith | 431/100 |
| 3,324,687 | 6/1967 | Swinyar | 431/100 |
| 3,367,149 | 2/1968 | Manske | 431/100 |
| 3,853,386 | 12/1974 | Ritter et al. | 350/1.6 |
| 3,929,510 | 12/1975 | Kittl | 136/247 |
| 4,097,311 | 6/1978 | Ishibashi et al. | 126/901 |
| 4,186,726 | 2/1980 | Spencer | 126/444 |
| 4,260,222 | 4/1981 | Kozawa | 428/702 |
| 4,331,829 | 5/1982 | Palazzetti et al. | 136/253 |
| 4,347,284 | 8/1984 | Tsutomu | 428/702 |
| 4,376,755 | 3/1983 | Narayan et al. | 126/901 |
| 4,419,532 | 12/1983 | Severns | 136/253 |
| 4,437,455 | 3/1984 | Jefferson | 126/901 |

OTHER PUBLICATIONS

H. Hoffler et al, *Solar Cells*, vol. 10, pp. 257-271 (1983).
H. E. Armstrong and T. M. Lawry, "The Phenomena of Luminosity and Their Possible Correlation with Radio-Activity", Roy. Soc. Proc., vol. 72, pp. 258-266, Jun. 11, 1903.
H. E. Ives et al., "A Physical Study of the Welsbach Mantle", Journ. Franklin Inst., vol. 186, No. 4, pp. 401-438 (Oct. 1918) and pp. 585-626 (Nov. 1918).
R. Wood, "Physical Optics", p. 781, Dover Publications, NY (1967).
E. Kauer, "Generating Light with Selective Thermal Radiators", Philips Technical Review, vol. 26, No. 2, pp. 33-47 (1965).
J. W. Mellor, "Inorganic and Theoretical Chemistry", vol. VII, pp. 213-220, John Wiley & Sons, Inc., NY (1963).
W. E. Forsythe, "Color Match and Spectral Distribution", J. Opt. Soc. Am., vol. 7, pp. 1115-1122 (Dec. 1923).

*Primary Examiner*—Carroll B. Dority, Jr.
*Attorney, Agent, or Firm*—Leonard A. Alkov; A. W. Karambelas

[57] ABSTRACT

An improved thermal radiator uses host materials having high internal reflection and scattering co-efficients for improved effectiveness. Selective thermal radiators are used for frequency conversion of incident radiation through the Welsbach effect. A Welsbach material screen is used to convert incident IR radiation into visible radiation, permitting visual observation of IR radiation and facilitating control and monitoring of IR equipment. Welsbach material is also used as a dynamic IR target which converts incident visible radiation into a high resolution IR source pattern. Welsbach material is also employed as a temperature stable material for converting solar radiation into heat.

19 Claims, 3 Drawing Sheets

SELECTIVE THERMAL RADIATORS

This application is a continuation of application Ser. No. 664,441, filed Oct. 24, 1884, and now abandoned.

BACKGROUND OF THE INVENTION

The present invention relates generally to thermal radiators and more particularly has reference to thermal radiators with a thermal emissivity function which is strongly wavelength dependent.

Known refractory materials have a thermal emissivity function which is strongly wavelength dependent. For example, the materials may have high emissivity (and absorption) at the infrared wavelengths, high emissivity in the visible wavelength range, and very low emissivity at intermediate wavelengths. If a material having those emissivity characteristics and a black body are exposed to IR beams of equal intensity, the selective thermal radiator will emit visible radiation with higher efficiency (if radiation cooling predominates), i.e., the selective thermal radiator will appear brighter than the black body. This effect is known as the Welsbach effect and is extensively used in commercial gas lantern mantles.

Infrared (IR) monitoring and control is now done primarily by radiometers and thermocouples, which are of low resolution and inconvenient, or semiconductor devices. There is a need for a device which permits simple visual observation of the intensity of IR energy.

SUMMARY OF THE INVENTION

The present invention overcomes the problems which exist in the prior art.

The invention includes apparatus for conversion of radiation from one portion of the spectrum into radiation of another portion of the spectrum. In accordance with the invention, the apparatus employs selective thermal radiators adapted to exploit the Welsbach effect in the desired manner. The thermal radiators preferably consist of a mixture of refractory metal oxides, the relative concentration chosen so as to shape the emissivity function of the material for maximum visible output. Normally, a base material with high absorption in the infrared range of interest and low emissivity in the visible, e.g., zirconium or thorium oxide, is doped with a small amount of material having high emissivity in the visible and low emissivity elsewhere, e.g., cerium oxide. By a suitable choice of hosts, dopants, and structure, a selective emissivity target can be optimized for specific IR and visible wavelengths and specific applications.

In one embodiment of the invention, a selective emissivity target is provided for imaging of IR radiation. The target is adapted to provide a simple visual observation of IR radiation incident upon the target.

In another embodiment, a selective dynamic target is provided for conversion of an incident visible image (e.g, produced by a visible laser) into an IR target.

In still another embodiment, the selective thermal radiators are employed in a system adapted for capture of solar radiation and conversion to heat.

A principal object of the invention is to provide a device for converting radiation in the visible wavelength range to radiation in the infrared wavelength range.

A further object of the present invention is to provide a detector of IR energy which allows simple visual observation of incident IR energy.

A further object of the invention is to provide a device for converting visual radiation to a high IR source pattern.

Yet another object of the invention is to provide a target for imaging infrared radiation having selective thermal radiator material with high absorption at a selected infrared wavelength interval, high emissivity in a visible wavelength interval, and low emissivity at intermediate wavelengths, said selective thermal radiator material forming a target screen for infrared irradiation.

A still further object of the invention is to provide an infrared radiation target having source means for providing visible radiation and target screen means disposed to receive radiation from said source means, said target screen means comprising selective thermal radiator material having high absorption at infrared wavelengths and high emissivity at visible wavelengths.

Another object of the invention is to provide a converter of solar radiation to heat having a film of Welsbach material disposed to receive solar radiation, said material having high emissivity in the visible wavelength interval and low emissivity in the infrared interval, and heat exchanger means adapted to transfer heat from said Welsbach material to a heat utilization device.

Yet another object of the invention is to provide Welsbach material having a thermal emissivity function which is strongly wavelength dependent comprising base material having high absorption in a selected infrared wavelength interval, low emissivity at other wavelengths, and high internal reflection coefficient which produces internal scattering of incident radiation; and dopant material having high emissivity in a selected visible wavelength interval and low emissivity at other wavelengths.

These and other and further objects are features of the invention are apparent in the disclosure which includes the above below specification and claims and drawings.

DETAILED DESCRIPTION OF THE PREFERRED EMBODIMENTS

The following description is presented to enable any person skilled in the art to make and use the invention, and is provided in the context of a paticular application and its requirements. Various modifications to the preferred embodiment will be readily apparent to those skilled in the art, and the generic principles defined herein may be applied to other embodiments and applications. Thus, the present invention is not intended to be limited to the embodiment shown, but is to be accorded the widest scope consistent with the principles and novel features disclosed herein.

Figure 1:
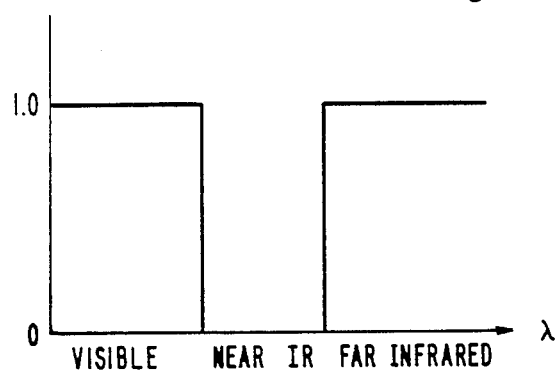
FIG. 1 is a graph illustrating the emissivity function of an ideal thermal radiator.

The invention is directed to the preparation and use of selective thermal radiators having a thermal emissivity function which is strongly wavelength dependent. Specifically, the materials have high emissivity (and absorption) in the IR wavelength interval of interest, high emissivity in the visible wavelength interval, and very low emissivity at the intermediate wavelength interval. This is illustrated schematically in FIG. 1, which depicts the emissivity function of an ideal thermal radiator.

Many explanations were proposed in the early 1900's for why the illumination provided by a gas lantern at visible wavelengths is so effectively enhanced by the presence of a mantle (the Welsbach effect). H. E. Armstrong, T. M. Lawry, Proc. Roy. Soc 72, 258 (1903). It was demonstrated that the enhancement was not due to chemical reactions (H. Rubens, Amend. Phys. 20, 539 (1903)), that the enhancement was made greater by removing atmospheric gases from the vicinity of the mantle (E. Podsgus, Zeif, F. Phys. 18, 212 (1923)), and that heat conduction paths to and from the mantle tended to diminish the effect. (H. E. Ives et al., Journ. Franklin Inst. 186,401,585 (1918).) These demonstrations led to widespread acceptance of Wood's explanation that the enhanced radiation was due to an increased mantle temperature resulting from a wavelength dependent emissivity. (R. Wood, Physical Optics, pp. 781, Dover Publications, N.Y. (1967).) Wood reasoned that, if a material irradiated by an adjacent flame could not emit radiation at all wavelengths, then it would have to attain a high temperature in order for the total hindered emitted radiation flux to balance an unhindered incoming flux. As an example, a mixture of $CeO_2$ and $ThO_2$ has high emissivity in the visible and far IR, and not at wavelengths in between. The mixture could, therefore, be heated by absorbing incoming radiation peaked at far IR wavelengths, and emit some of its radiation at visible wavelengths.

IMPROVED WELSBACH MATERIAL

One aspect of the present invention is the discovery that, in addition to the partial trapping of radiation due to a wavelength dependent emissivity, the partial trapping due to scattering induced total internal reflection also plays an important role in the Welsbach effect. This additional contribution suggests that the effect can be enhanced by increasing the number of physical imperfections and the index of refraction of the Welsbach material.

To demonstrate this, radiation of intensity $I_{IN}(\lambda)$ is considered incident upon the left face of a vertical slab of thickness L. The slab is characterized by an absorption coefficient $\alpha(\lambda)$, and an emission coefficient $\epsilon(\lambda)$ related to $\alpha(\lambda)$ by the Einstein relation $\epsilon(\lambda) = I_{BB}(\lambda) \alpha(\lambda)$, where $I_{BB}(\lambda)$ is the Planck black body spectrum.

$$I_{BB}(\lambda) = C_1 \lambda^{-5} [\exp(C_2/\lambda T) - 1]^{-1} \quad (1)$$

In addition, the slab is taken to have a reflection coefficient $r_o(\lambda)$ for radiation entering the slab, a reflection coefficient $r(\lambda)$ for radiation leaving the slab and an inverse scattering lengths $s(\lambda)$. The reflection coefficients depend on the angle of incidence of the radiation on the surface. In the following simplified treatment of radiation transport through the slab, r and $r_o$ are assumed to denote appropriate averages over the angular distributions of the radiation. Denoting distance through the slab from left to right by the coordinate x, Equations (2) and (3) set forth the radiation transport equations in the slab.

$$\frac{dI_+}{dx}(x,\lambda) = [I_{BB}(\lambda) - I_+(x,\lambda)]\alpha(\lambda) + [I_-(x,\lambda) - I_+(x,\lambda)]s(\lambda) \quad (2)$$

$$\frac{-dI_-}{dx}(x,\lambda) = [I_{BB}(\lambda) - I_-(x,\lambda)]\alpha(\lambda) + [I_+(x,\lambda) - I_-(x,\lambda)]s(\lambda) \quad (3)$$

where $I_+(x,\lambda)$ and $I_-(x,\lambda)$ denote the intensities of radiation moving to the right and to the left, respectively. In Equations (2) and (3), the scattering coefficient denotes an appropriate average of the scattering coefficient for different angles of scattering. The most effective Welsbach materials seem to be those with considerable internal scattering (R. Wood, Physical Optics, p. 781), so in fact, the angular average probably heavily weights large angle scatterings. On solving Equations (2) and (3) subject to the boundary conditions, $$I_+(o,\lambda) = I_-(o,\lambda)r(\lambda) + I_{in}(\lambda)[1 - r_o(\lambda)] \quad (4)$$

$$I_-(L,\lambda) = I_+(L,\lambda)r(\lambda) \quad (5)$$

Equation 6 sets forth the radiation emitted by the slab on the right.

$$I_R = (1 - r)\left[I_{BB} + \frac{1}{\Delta}(C_+ e^{kL} + C_- e^{-kL})\right] \quad (6)$$

Equation 7 sets forth the radiation emitted by the slab on the left.

$$I_L = (1 - r)\left[I_{BB} + \frac{1}{\Delta}\left(C_+\left(\frac{k + \alpha'}{s}\right) + C_-\left(\frac{\alpha' - k}{s}\right)\right)\right] \quad (7)$$

In Equations (6) and (7), the $\lambda$ argument has been suppressed, and $$k = [\alpha(\alpha + 2s)]^{\frac{1}{2}}, \quad \alpha' = \alpha + s \quad (8)$$

$$\Delta = e^{-kL}\left[1 - r\left(\frac{\alpha' + k}{s}\right)\right]\left[\frac{\alpha' - k}{s} - r\right] - \quad (9)$$

$$e^{kL}\left[1 - r\left(\frac{\alpha' - k}{s}\right)\right]\left[\frac{\alpha' + k}{s} - r\right]$$

$$C_+ = [I_{in}(1 - r_o) - I_{BB}]\left[\frac{\alpha' - k}{s} - r\right]e^{-kL} + \quad (10)$$

$$\left[1 - r\frac{(\alpha' - k)}{s}\right](1 - r)I_{BB}$$

$$C_- = -C_+(k \to -k) \quad (11)$$

If the emitted radiation at wavelengths where the material emissivity is small ($\alpha L \ll 1$) is ignored as being of $O(\alpha L)$ compared to the radiation from optically thick regions, and if in the optically thick regions $\alpha$ is taken to be larger than s, then equations (6)-(11) give directly the approximate relation of Equation (12), $$\frac{1}{2}\int_{\alpha L \gg 1} d\lambda[1 - r_o(\lambda)]I_{in}(\lambda) \approx \int_{\alpha L \gg 1} d\lambda[1 - r(\lambda)]I_{BB}(\lambda) \quad (12)$$

where the integrations are over the wavelengths where the material is optically thick ($\alpha L \gg 1$). It is apparent that Equation (12) simply balances the emitted flux from the two faces of a gray body with the net flux entering the slab from the left.

From Equation (12), it is evident that if $r \gg r_o$, the effective temperature of the outgoing radiation must be higher than the effective temperature of the incident radiation, in order for the overall flux balance to be satisfied. Very roughly, when the incident radiation spectrum approximates a black body spectrum of temperature $T_{IN}$, then $$T_{BB} = T_{IN}[(1-r_o)/(1-r)]^{\frac{1}{4}} \quad (13)$$

where $r$ and $r_o$ should be some appropriate weighted values of the reflection co-efficients determined by the detailed wavelength dependence of the slab reflection and absorption coefficient, and of the incident radiation.

To estimate the reflection coefficient $r_o$, it is assumed that the radiation incident on the slab is travelling practically normal to the surface. Then, if the slab has an index of refraction n, the reflection coefficient $r_o$ is $$r_o = \left(\frac{n-1}{n+1}\right)^2 \quad (14)$$

To estimate r, it is assumed that radation internal to the slab is scattered many times before reaching the surfaces. If the radiation inside the slab is taken to be isotropic, then r is given by $(4\pi)^{-1}$ times the solid angle containing rays which hit the surfaces at angles greater than the critical angle $\theta_c = \sin^{-1}(1/n)$ for total internal reflection, i.e., $$r = \left(1 - \frac{1}{n^2}\right)^{\frac{1}{2}} \quad (15)$$

For n=1.5, for instance $r \approx \frac{3}{4}$ and $r_o = 0.04$, so that $r/r_o \gg 1$. For large n, Equations (14) and (15) give $$T_{BB} \approx T_{IN}(8n)^{\frac{1}{4}} \quad (16)$$

The role of reflection induced partial trapping in enhancing radiation has experimental support in the radiation from powered metals, laminated mica, and sodium pyrophosphate with randomly oriented microfractures. Of these three examples, the last clearly illustrates the additional gain provided by the condition $r > r_o$.

The foregoing suggests that the most effective Welsbach material is one which combines the partial radiation trapping due to a wavelength dependent emissivity with that due to scatter induced total internal reflection in a high index of refraction.

Examples of Welsbach material having a high internal reflection coefficient are materials which have been pulverized or which have physical imperfections, e.g., cracks or cavities, or which are porous. It is desired that the radiation be scattered internally in the material.

As described above, the Welsbach effect causes the effective temperature of radiation incident upon a body to be raised by partially trapping the radiation in the body. This partial trapping is due both to a wavelength dependent emissivity which makes it impossible for the body to radiate effectively at certain wavelengths, and to scattering of the radiation within the body to angles greater than the critical angle for total internal reflection at the body surface. This partial trapping produces an enhanced temperature for the radiation emitted by the body in order that the hindered outgoing radiation flux can balance the unhindered incident flux.

The wavelength dependent emissivity and the enhanced radiation temperature due to the partial trapping has implications both for up-converting and down-converting radiation wavelengths. In particular, if the Welsbach material is made to have large emissivity only at visible wavelengths and at wavelengths in the far IR, then it can serve to very efficiently convert radiation between these two ranges of wavelengths. For example, if the incoming radiation is centered at visible wavelengths, thermalization of this radiation in the Welsbach material will cause the material to radiate efficiently at only those wavelengths in the far infrared where the emissivity is large. Since for a black body, the radiation intensity $I(\lambda, T)$ at a wavelength $\lambda$ longer than the wavelength at the maximum of the Planck black body, is given by the Rayleigh-Jeans law, $$I(\lambda, T) = 2\pi cKT/\lambda^4, \quad \lambda > \lambda_n, \quad (17)$$

the enhanced temperature T will result in more efficient transfer of energy from visible wavelengths to the far IR. Here, c is the speed of light, K is Boltzmann's constant, T is the temperature, and $\lambda_n$ is given by $$\lambda_n T = 0.28478 \times 10^{-2} n^\circ K \quad (18)$$

Accordingly, the efficiency of conversion of visible to far IR wavelengths is higher for radiation trapping Welsbach materials than for a black body material.

SELECTIVE THERMAL RADIATOR COMPOSITION

Figure 2:
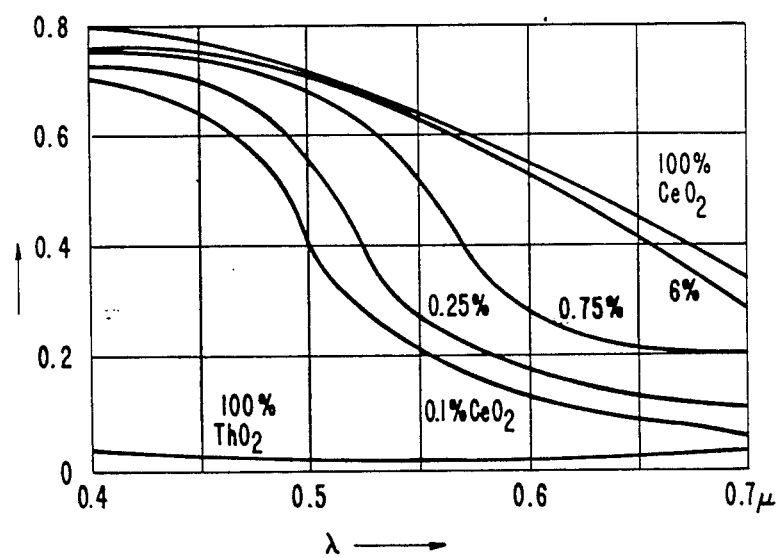
FIG. 2 is a graph illustrating the dependence of spectral emissivity in the visible range on the concentration of cerium oxide in a thorium oxide/cerium oxide mixture.

Selective thermal radiators usually consist of a mixture of refractory metal oxides, the relative concentration chosen so as to shape the emissivity function of the material for maximum visible output. Normally, a base material with high absorption in the infrared range of interest and a low emissivity in the visible, e.g., zirconium or thorium oxide, is doped with a small amount of material having high emissivity in the visible and low emissivity elsewhere, e.g., cerium oxide. FIG. 2 is a graph illustrating the dependence of spectral emissivity in the visible range on the concentration of a cerium oxide in a thorium oxide/cerium oxide mixture ($ThO_2 - CeO_2$).

By a suitable choice of hosts, dopants and structure, a selective emissivity target based upon the selective thermal radiator concept can be optimized for specific IR and visible wavelengths and specific applications. For example, by allowing for radiation cooling only (in contrast to convection and conduction cooling), a dynamic range of input powers in excess of 1,000 can be achieved.

WELSBACH TARGET IMAGING OF IR RADIATION

Welsbach material may be employed as a selective emissivity target for imaging of IR radiation. Thus, the target operates as an up-converter of IR to visible radiation, converting incident IR radiation into a visual image representative of the intensity of the incident IR radiation. The selective thermal radiator material may be configured as a target screen.

Figure 3:
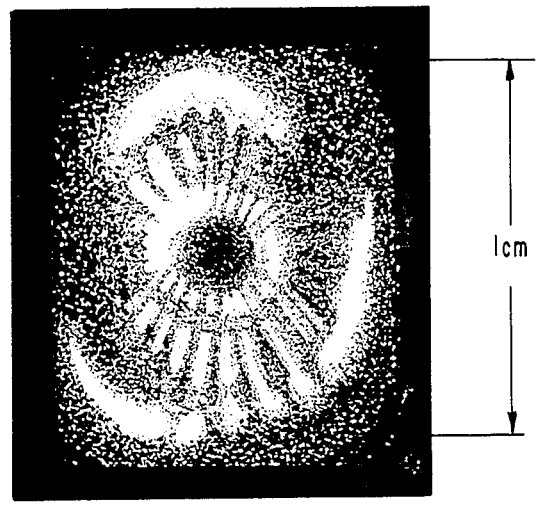
FIG. 3 illustrates a multi-mode $CO_2$ laser beam pattern imaged on a Welsbach screen.

For illustration, a Welsbach material screen was irradiated with high and low power infrared laser beams. The ensuing light emission was observed either visually or with the aid of light-sensing devices equipped with suitable color and neutral density filters. FIG. 3 shows a multi-mode $CO_2$ laser beam pattern imaged on a Welsbach screen with sub-millimeter spatial resolution. The total power in the imaged beam was about 50 watts.

The Welsbach screen was made by saturating woven silk fabric with a mixture of thorium nitrate (1000 gm), cerium nitrate (10 gm), beryllium nitrate (5 gm), magnesium nitrate (1.5 gm) and water (2000 gm). The cloth is dipped in the solution and then pyrolyzed at about 1600°–1700° C. In this process, the fabric is burnt off and the nitrates are transformed into oxides and sintered. Since the fabric fibers retain the nitrates absorbed from the aqueous solution, the sintered oxides retain the form of the fabric fibers and thus the Welsbach screen retains the form and shape of the original fabric. The beryllium and magnesium oxides strengthen the screen.

To take advantage of high resolution properties of the photographic film, a high temperature thermal image of the beam profile was produced on the Welsbach screen and photographed with a still camera. The photograph depicted in FIG. 3 exhibits resolution in excess of 3 lines per millimeter with MTF (contrast) better than 50%.

Analysis indicates that equal or even better resolution may be obtained if, instead of the photographic film, an infrared scanning material with equal or superior resolution capability were used to record the image.

The sensitivity threshold of an imaging screen depends on the material composition and thickness of the screen. The ultimate limit is determined by thermal cooling effects. Images with flux density of 300 MW/cm² in the beam have been produced experimentally.

The upper limit of irradiation beyond which degradation of the material may occur depends on the properties of the materials and also on the efficiency of cooling and filtering. The damage threshold is a function of absorptivity and, therefore, depends on the wavelength and intensity of the impinging radiation, as well as the material composition and surface condition of the target board. For a $CO_2$ laser, the demonstrated destruction limit occurred between 500 and 850 watts/cm², whereas in earlier work for a $DF_2$ laser, emitting at 5 microns, this limit was between 4,000 and 5,000 watts/cm².

Figure 4:
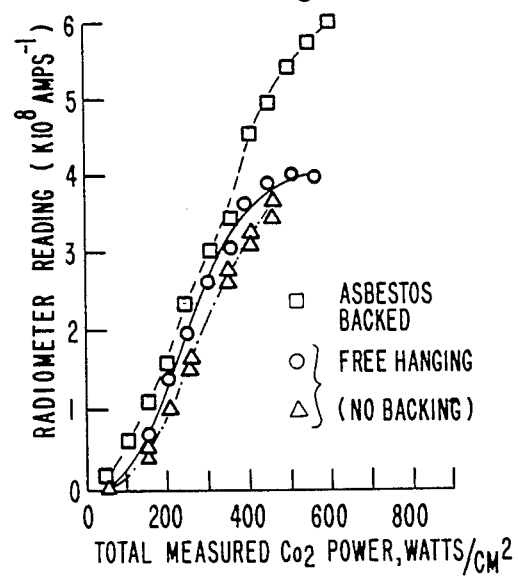
FIG. 4 is a graph illustrating experimental results obtained on Welsbach screens using a $CO_2$ laser.

FIG. 4 shows the experimental results obtained on some of the Welsbach sample screens using a $CO_2$ laser. It follows from those curves that the damage threshold as well as the IR-to-visible conversion efficiency depends on the backing material in addition to the physical properties of the Welsbach material itself. The curves also show that the curve representing the functional relationship between the visible output and IR input has a linear segment between 100 and 500 watts/cm² input power density. The shapes and slopes of the experimental curves are in general agreement with those of a curve representing Wien's approximation of Planck's law, i.e., $$I_{vis} = a(\lambda) \exp(-ch/\lambda KT) \tag{19}$$

where a is a function of wavelength and c is the speed of light. Assuming that under equilibrium conditions, in the absence of conduction and convection cooling, the relationship between the infrared energy absorbed by a thin sample and its temperature is given by the Stefan-Boltzmann law, the temperature T can be replaced in $I_{vis}$ in Equation (19) by $(I_R/\sigma)^{\frac{1}{4}}$. Taking the logarithm of both sides of Equation (19) the following expression is obtained.

$$\ln I_{vis} = \ln a - ch/[\lambda K(I_{IR}/\sigma)^{\frac{1}{4}}] \tag{20}$$

A narrow-band filter transmitting red light ($\lambda = 6 \times 10^{31.5}$ cm) was used to obtain the curves shown in FIG. 4. Substituting this value for $\lambda$ in Equation (20), this relationship can be written in the following form $$\ln I_{vis} = \ln a - 36.9 \, I_{IR}^{-\frac{1}{4}} \tag{21}$$

Figure 5:
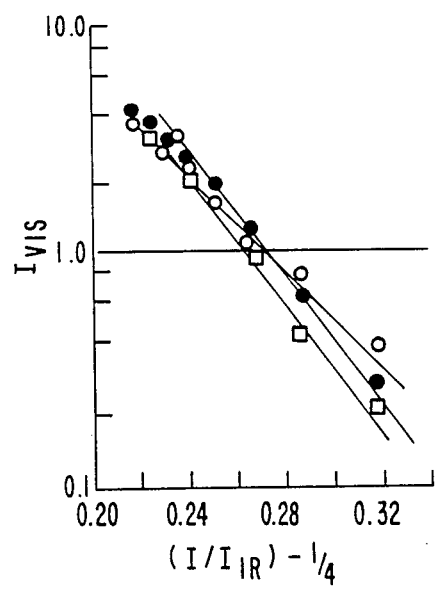
FIG. 5 is a graph plotting the visible light intensity versus the IR radiation intensity for an experimental device in accordance with the invention.

FIG. 5 shows the plots of $I_{vis}$ versus $(1/I_{IR})^{-\frac{1}{4}}$ on a semi-log graph for experimental curves. The average experimental slope of $-32.2$ is a fairly close match with the theoretical slope of $-36.9$.

Preliminary studies of the time response of Welsbach materials have also been conducted by modulating the input laser power. Modulation of the output visible radiation was observed when the input laser was pulsed at frequencies as high as 1,000 pulses per second. Thermal decay was found to be 20 milliseconds for Welsbach material 0.2 mm in thickness heated to 1,000° K.

Other exemplary applications for this target screen include field testing (go/no go) of $CO_2$ laser rangefinders for power output and beam profile and test bench alignment of a $CO_2$ laser beam.

INFRARED DYNAMIC TARGET

In another embodiment, selective thermal radiators may be employed as an infrared dynamic target. It has been demonstrated above that selective thermal radiators convert infrared radiation into visible radiation more efficiently than a black body. It follows from the thermodynamic principle of a detailed balance that the reverse process is also equally probable. Thus, it should be possible to convert a visible image into an infrared image with the aid of selective thermal radiators. The visible image can be produced, for example, with a visible laser, such as a HeNe laser, and the infrared output can be observed with a forward-looking infrared radar (FLIR).

Experimental results have been obtained indicating the validity of this theory. A 3 mm diameter beam of a $\frac{1}{2}$ watt HeNe laser was directed first at a membrane of Welsbach material and then at a piece of carbon cloth (black body). Both materials were observed at wavelengths between 8–14 microns with a UTI IR scanning camera. The spot where the laser beam hit the Welsbach material was clearly visible in the IR, whereas the spot was not sufficiently intense to show up on the black body.

The foregoing results indicate that the Welsbach material may have (i) appropriate resolution (submillimeter), (ii) adequate temperature range (melting temperatures around 3,000° K.), (iii) adequate time response (20 msec. at 1,000° K. and 0.2 mm thickness) for use as a dynamic IR target.

SOLAR RADIATION CONVERTER

In another embodiment of the invention, Welsbach material is employed to convert visible solar radiation to heat.

Some Welsbach materials are well suited for making films which have high emissivity in the visible and low emissivity in the infrared. Examples of such Welsbach materials are $CeO_2$, $Gd_2O_3$, $Yb_2O_3$. These films can be used to obtain high temperatures via the "greenhouse" effect in which visible solar radiation is converted to heat and heat is subsequently trapped. Because Welsbach materials have high temperature stability (e.g., the melting point of $ThO_2$ is 3220° C.) and can be made to have low emissivity over a large range of IR wavelengths, they are particularly well suited for this application.

Figure 6:
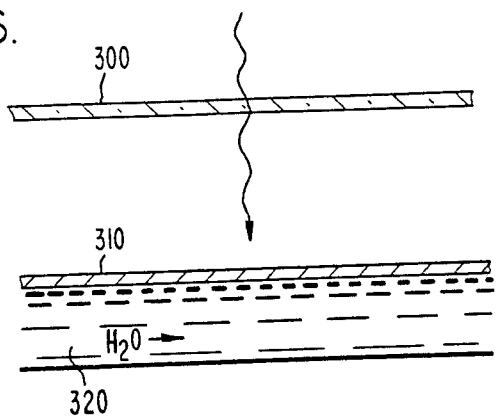
FIG. 6 is a simple diagram illustrating a solar radiation-to-heat converter in accordance with the invention.

FIG. 6 is a schematic diagram illustrating that embodiment of the invention. The incident solar flux passes through a transparent layer 300, e.g., glass, and impinges on a Welsbach film 310. As a result, the film is heated to high temperatures. If desired, a heat exchanger may be employed to extract the heat for other utilization. For example, water may be pumped through a passage 320 to absorb heat from the Welsbach material and transfer the heat to a utilization apparatus.

WELSBACH MATERIAL PREPARATION

Several techniques can be used to manufacture Welsbach screens. The most common is the pyrolysis technique. A woven thin cotton or silk fabric is dipped in a saturated solution of thorium or zirconium and rare earth ions. The fabric retains some of the salts in its pores. The impregnated fabric is subsequently pyrolized. During this process, the organic matrix burns away and nitrates convert into oxides and, through a sintering process, form ceramic fibers. The end result is a thin ceramic cloth or felt. The thinnest screens produced by this technique have been 200-300 microns.

Thinner Welsbach membranes can be produced using plasma deposition, sputtering or ion implantation techniques. All of these techniques involve depositing a thin film of Welsbach materials on a suitable substrate which is later either burned away or dissolved to leave a free standing thin Welsbach membrane.

Plasma deposition is the most frequently used technique. The heart of the plasma deposition apparatus is a plasma arc spray gun which propels gas through a dc arc. The gas expands violently as it is heated by the arc. The Welsbach materials are introduced downstream into the plasma. Kinetic energy from the rapidly moving gas atoms and energy released by the ions and electrons recombining on the surfaces of the particles heat the powder to a very high temperature. The rapidly expanding gas stream propels the molten particles to the surface of a target where they coalesce, forming a coating. Plasma spraying is relatively inexpensive and is commercially available. Coatings as thin as 25 microns have been produced using this technique.

Two approaches can be used to produce even thinner membranes. One involves grinding down the plasma sprayed coatings to a desired thickness. The other involves use of high vacuum techniques such as sputtering or ion implantation. Sputtering has been used successfully to produce thin films of zirconia and thorium.

The sputtering process comprises ejection of atoms from the surface of a target material by bombardment with energetic particles or photons. The most important practical application of sputtering is deposition of thin films.

One of the chief advantages of the sputtering technique in production of thin films is that the sputtering yield and the rate of deposition can be controlled with a high degree of accuracy by electronically controlling the particle flux density.

Several sputtering techniques are useful for deposition of films. The simplest and most widely used technique utilizes the glow discharge between two electrodes. That technique is known as diode sputtering. The substrate in such a system is normally placed on the anode and kept at anode potential. Other low-pressure sputtering techniques are dc bias, ac asymmetric and ion plating. All these techniques require 20-to-100 mTorr pressure range. Ion plating is a two-stage thin film technique which consists of deposition by evaporation with subsequent dc sputtering.

Glow discharge sputtering normally results in low yield. High ionization yield may be obtained conveniently by the use of rf or other high intensity electromagnetic radiation. To increase the sputtering rate, an ion-beam (duoplasmatron) technique is used.

It is understood that the above described embodiments are merely illustrative of the many possible specific embodiments which can represent principles of the present invention. Numerous and varied other arrangements can readily be devised in accordance with these principles by those skilled in the art without departing from the spirit and scope of the invention.

While the invention has been described with reference to specific embodiments, the exact nature and scope of the invention is defined in the following claims.

What is claimed is:

1. A method for producing an image of applied infrared radiation, comprising the steps of:
   (i) providing a means for converting incident infrared radiation within an infrared wavelength interval into visible radiation within a visible wavelength interval, said means comprising a screen means for efficiently absorbing said incident infrared radiation, said screen means further comprising means for producing high internal scattering of said absorbed incident infrared radiation within said screen means, and means responsive to said absorbed infrared radiation for producing a visible light image corresponding to the intensity of said infrared radiation, said screen means comprising a screen formed from a selective radiator material less than 300 microns in thickness and having the properties of high absorption of said incident infrared radiation within said infrared wavelength interval, high internal reflection of said absorbed infrared radiation, high emissivity of radiation within said visible wavelength interval and low emissivity at intermediate wavelengths;
   (ii) illuminating said screen with radiation within said infrared wavelength interval; and
   (iii) radiating light from said screen in response to said illumination to provide a visible light image corresponding to the intensity of the illumination radiation.

2. A method for producing desired patterns of infrared radiation, comprising the steps of:
  (i) providing a means for converting patterns of incident visible radiation having corresponding spatial intensity distributions into infrared radiation patterns having spatial intensity distributions corresponding to said spatial intensity distributions of said visible radiation patterns, said means comprising a screen less than 300 microns in thickness of selective thermal radiator material having high absorption at visible wavelengths and high emissivity at infrared wavelengths;
  (ii) illuminating said screen with selected patterns of visible radiation having corresponding spatial intensity distributions corresponding to said desired patterns; and
  (iii) radiating infrared light from said screen in response to said illumination to produce said desired patterns of infrared radiation.

3. A system for producing a visible image of the spatial intensity distribution of an infrared beam generated by an infrared laser, comprising:
  an infrared laser for producing an infrared light beam having a cross-sectional spatial intensity distribution;
  a target screen disposed for illumination by said infrared light beam, said screen comprising means for receiving said infrared light beam and converting said received infrared radiation into a visible image having a visible spatial intensity distribution corresponding to said intensity distribution of said infrared light beam;
  said target screen comprising a thin screen less than 300 microns in thickness and formed from a selective radiator material comprising a base material comprising means for efficiently absorbing said incident infrared radiation and means for providing high internal reflection of said absorbed infrared radiation, and a dopant material responsive to said absorbed radiation for emitting radiation within a visible wavelength interval, said selective thermal radiator material having low emissivity at intermediate wavelengths.

4. The system of claim 3 wherein said base material is selected from the group consisting of zirconium oxide and thorium oxide, and said dopant comprises cerium oxide.

5. The system of claim 3 wherein said infrared laser is a carbon dioxide laser.

6. A system for producing a visible image of the spatial intensity distribution of an infrared beam generated by an infrared laser, comprising:
  an infrared laser for generating an infrared light beam having a selected cross-sectional spatial intensity distribution forming an infrared image;
  a target screen disposed for illumination by said infrared light beam, said screen comprising means for converting said infrared light beam into a visible image having said spatial intensity distribution, said means comprising a layer of selective thermal radiator material less than 300 microns thick, said material comprising a base material selected from the group consisting of zirconium oxide and thorium oxide, and a dopant material comprising cerium oxide.

7. A system for providing an infrared image having a selected spatial intensity distribution, comprising:
  a visible laser for providing a visible light beam having a selected cross-sectional spatial intensity distribution;
  a target screen disposed for illumination by said visible light beam, said screen comprising means for converting said incident visible light beam into an infrared image having a spatial intensity distribution corresponding to said visible light beam distribution, said means comprising a layer of selective thermal radiator material less than 300 microns thick, said material comprising a base material selected from the group consisting of zirconium oxide and thorium oxide, and a dopant material comprising cerium oxide.

8. The system of claim 7 wherein said visible laser comprises a HeNe laser.

9. The system of claim 7 further comprising a means responsive to said emitted infrared image for observing said image.

10. The system of claim 9 wherein said means for observing said infrared image comprises a forward-looking infrared radar.

11. The method of claim 1 wherein said illuminating step compries applying a pattern of said infrared radiation and said radiating step comprises producing an image of said pattern.

12. The method of claim 11 wherein said pattern comprises a beam of infrared radiation.

13. The method of claim 12 wherein said beam is focused.

14. The method of claim 13 wherein said image comprises a profile of said focused beam.

15. The method of claim 1 wherein said illuminating step comprises applying laser radiation.

16. The method of claim 1 wherein said illuminating step comprises the sole means for heating said screen.

17. The method of claim 2 wherein said patterns of visible radiation comprises images.

18. The method of claim 2 wherein said illuminating step comprises applying laser radiation.

19. The method of claim 2 wherein said illuminating step comprises the sole means for heating said target.

* * * * *